US008529656B2

(12) United States Patent
Hashiba et al.

(10) Patent No.: US 8,529,656 B2
(45) Date of Patent: Sep. 10, 2013

(54) PROJECTION DISPLAY DEVICE

(75) Inventors: Yuji Hashiba, Kizugawa (JP); Toshihiro Saruwatari, Kishiwada (JP); Lei Zhang, Shenzen (CN)

(73) Assignees: SANYO Electric Co., Ltd., Moriguchi-shi, Osaka (JP); SANYO Technology Center (Shenzhen) Co., Ltd., Shenzhen (CN)

( * ) Notice: Subject to any disclaimer, the term of this patent is extended or adjusted under 35 U.S.C. 154(b) by 54 days.

(21) Appl. No.: 13/213,594

(22) Filed: Aug. 19, 2011

(65) Prior Publication Data
US 2012/0047857 A1 Mar. 1, 2012

(30) Foreign Application Priority Data

Aug. 30, 2010 (JP) ................................. 2010-192994

(51) Int. Cl.
*G03B 21/18* (2006.01)
*G03B 21/26* (2006.01)
(52) U.S. Cl.
USPC ................ 55/385.1; 353/52; 353/55; 353/57; 353/60; 353/61
(58) Field of Classification Search
USPC ................ 55/385.1; 95/1, 14, 15, 17, 19, 23, 95/25, 26, 273; 96/421, 422, 420, 417, 418, 96/424; 340/607; 345/32; 349/104, 105, 349/106, 107; 353/52, 55, 57, 60, 61; 359/308, 359/339, 358, 588, 590; 348/273
See application file for complete search history.

(56) References Cited

U.S. PATENT DOCUMENTS

| | | | | |
|---|---|---|---|---|
| 3,338,132 A | * | 8/1967 | Ruhle et al. | 353/55 |
| 7,527,680 B2 | * | 5/2009 | Horiguchi et al. | 96/422 |
| 7,854,517 B2 | * | 12/2010 | Tsubura | 353/52 |
| 7,862,186 B2 | * | 1/2011 | Hamada | 353/119 |
| 8,251,522 B2 | * | 8/2012 | Oda | 353/99 |
| 2001/0052963 A1 | * | 12/2001 | Hashizume et al. | 353/30 |
| 2005/0030484 A1 | * | 2/2005 | Kuroda | 353/57 |
| 2011/0075117 A1 | * | 3/2011 | Adachi et al. | 353/119 |
| 2011/0176117 A1 | * | 7/2011 | Kondo | 353/61 |
| 2011/0299045 A1 | * | 12/2011 | Kotani | 353/57 |
| 2012/0008100 A1 | * | 1/2012 | Tani et al. | 353/58 |

FOREIGN PATENT DOCUMENTS

JP 2002-062589 A 2/2002

* cited by examiner

*Primary Examiner* — Duane Smith
*Assistant Examiner* — Minh-Chau Pham
(74) *Attorney, Agent, or Firm* — Westerman, Hattori, Daniels & Adrian, LLP (57) ABSTRACT

A projection display device includes: a leg section that supports a main body of the projection display device with respect to an installation surface on which the main body is installed; and a filter section that is disposed on a bottom of the main body and exposes a first air intake surface to the outside. In this arrangement, the first air intake surface is inclined with respect to the bottom surface of the main body in a direction that departs from the installation surface, and air flows into the filter section through a clearance between the first air intake surface and the installation surface.

4 Claims, 13 Drawing Sheets

PROJECTION DISPLAY DEVICE

This application claims priority under 35 U.S.C. Section 119 of Japanese Patent Application No. 2010-192994 filed Aug. 30, 2010, entitled "PROJECTION DISPLAY DEVICE". The disclosure of the above application is incorporated herein by reference.

BACKGROUND OF THE INVENTION

1. Field of the Invention

The present invention relates to a projection display device for modulating light by an imager, and enlarging and projecting the modulated light onto a projection plane.

2. Disclosure of Related Art

In a projection display device (hereinafter, called "projector"), light modulated by an imager such as a liquid crystal panel is projected by a projection lens onto a projection plane. Such a projector includes a cooling unit that cools down heat-generating components such as an imager. The cooling unit supplies air taken from the outside to the heat-generating components to thereby cool down the heat-generating components.

External air is taken into a main body cabinet through an air inlet provided in the main body cabinet. A filter is arranged at the air inlet to remove dirt and dust from the air to be taken into the main body cabinet.

In many cases, the air inlet and the filter are provided on any of front, rear, right, and left side surfaces of the main body cabinet. However, the air inlet and the filter may not be provided on the front, rear, right, or left side surface but may be provided on a bottom surface of the main body cabinet, depending on the location of the cooling unit within the main body cabinet or the structure of the cooling unit.

The main body cabinet has on the bottom surface thereof a plurality of leg sections supporting the main body cabinet. If the air inlet and the filter are provided on the bottom surface of the main body cabinet as stated above, when the projector is placed on an installation surface such as a tabletop, external air flows into the air inlet through a clearance between the bottom surface of the main body cabinet and the installation surface.

The filter has desirably a multilayered structure so as to be enhanced in effect of collecting dust and the like. However, if the filter has a multilayered structure, the filter increases in thickness whereby the projector is likely to be larger in height including the leg sections.

SUMMARY OF THE INVENTION

A projection display device in a main aspect of the present invention includes: a leg section which supports a main body of the projection display device with respect to an installation surface on which the main body is installed; and a filter section which is disposed on a bottom of the main body and exposes a first air intake surface to the outside. In this arrangement, the first air intake surface is inclined with respect to the bottom surface of the main body in a direction that departs from the installation surface, and air flows into the filter section through a clearance between the first air intake surface and the installation surface.

BRIEF DESCRIPTION OF THE DRAWINGS

These and other objects, and novel features of the present invention will become more apparent upon reading the following detailed description of the embodiment along with the accompanying drawings.

The drawings are provided only for describing the present invention, and do not limit the scope of the present invention.

DESCRIPTION OF PREFERRED EMBODIMENTS

An embodiment of the present invention will be described below referring to the drawings.

In this embodiment, fixing legs 18 correspond to a "leg section" recited in the claims. A filter attachment portion 81 corresponds to a "filter storage portion" recited in the claims. A first bottom surface 814 corresponds to a "first surface" recited in the claims. A second bottom surface 821 corresponds to a "bottom surface of a main body" recited in the claims. A front surface wall 822 corresponds to a "second surface" recited in the claims. Bottom surface air inlets 831 corresponds to a "first air inlet" recited in the claims. A side surface air inlet 832 corresponds to a "second air inlet" recited in the claims. A filter unit 90 corresponds to a "filter section" recited in the claims. Adhesion preventive ribs 913c correspond to a "rib" recited in the claims. However, the foregoing correspondences in description between the claims and the embodiment are merely examples, and are not intended to limit the claims to this embodiment.

Figure 1:
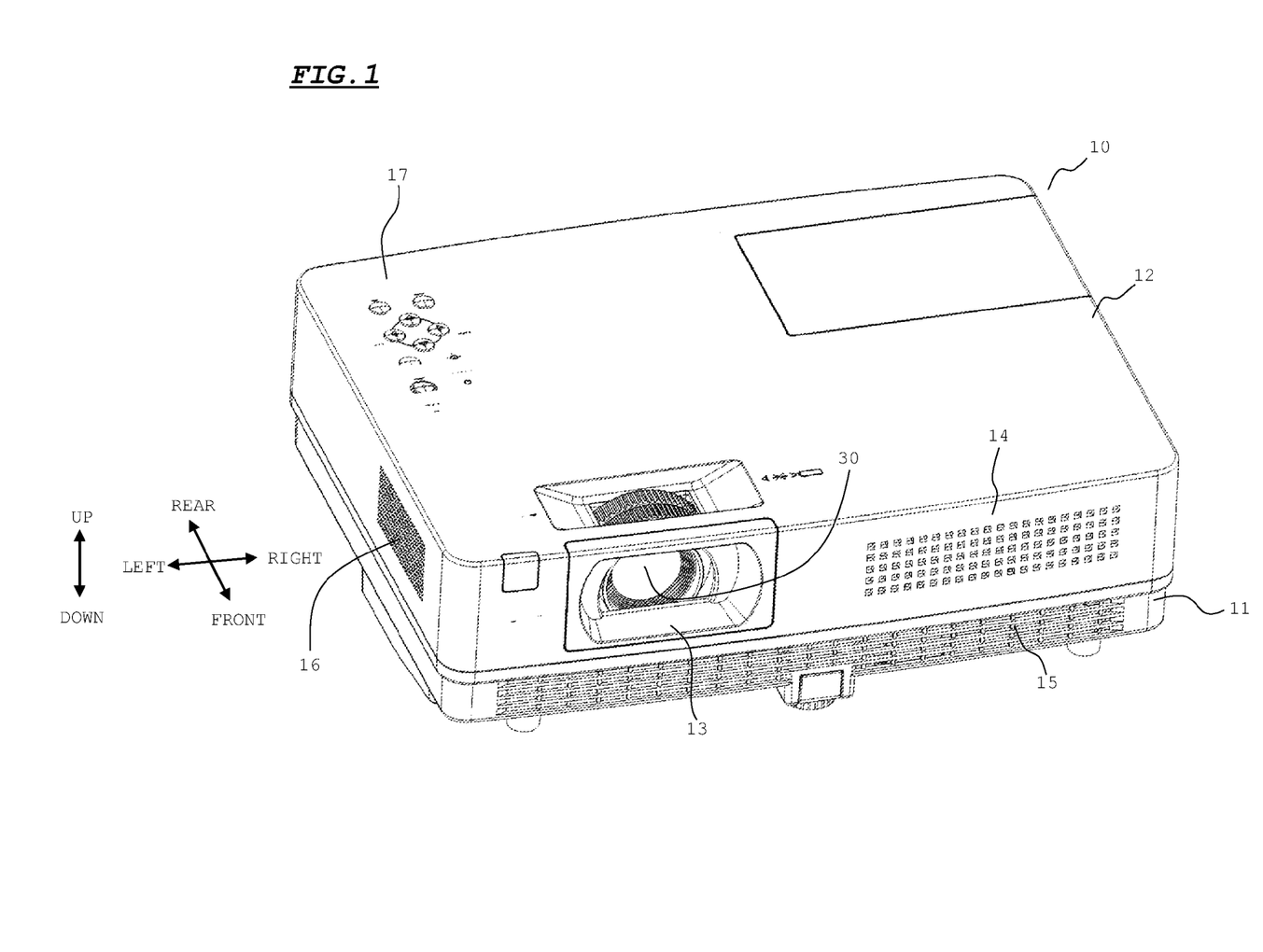
FIG. 1 is a perspective view of an external configuration of a projector in an embodiment of the present invention.

FIG. 1 is a perspective front view of an external configuration of a projector.

Referring to FIG. 1, the projector includes a main body cabinet 10. The main body cabinet 10 is constituted by a lower cabinet 11 and an upper cabinet 12 placed on the lower cabinet 11 from above.

The main body cabinet 10 has a projection window 13 on a left side of a front surface thereof. A projection lens 30 is exposed outward at the projection window 13. In addition, the main body cabinet 10 has an upper air inlet 14 and a lower air inlet 15 on a right side of the front surface thereof. The main body cabinet 10 has a sound output port 16 on a left side surface thereof. The main body cabinet 10 has an operation section 17 on a top surface thereof. The operation section 17 has a plurality of operation keys and LEDs. The LEDs indicate operational status and error status.

Figure 2:
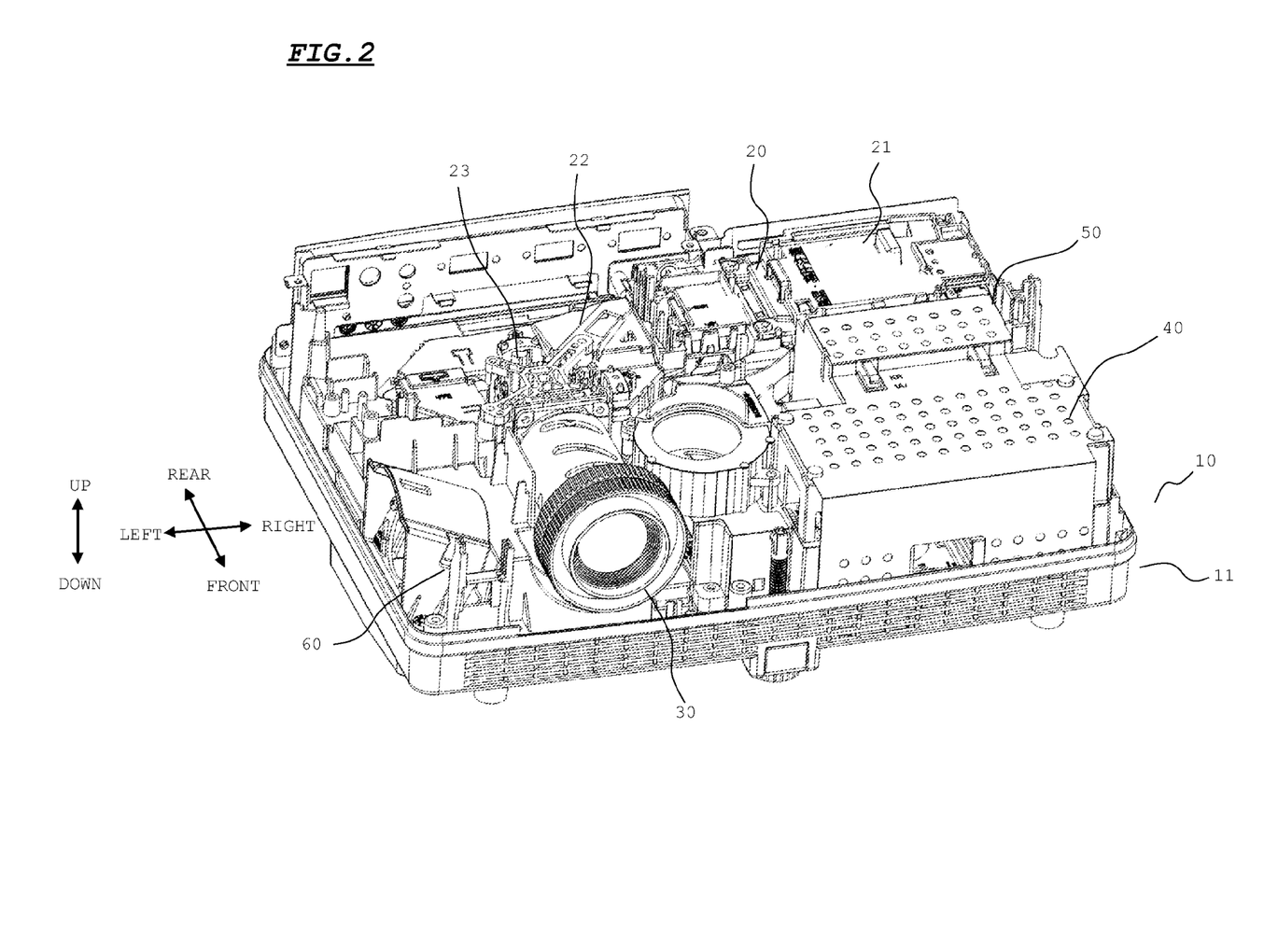
FIG. 2 is a perspective view of an internal configuration of the projector in the embodiment.

FIG. 2 is a perspective view of an internal configuration of the projector.

As shown in FIG. 2, the lower cabinet 11 has an optical engine 20, a projection lens 30, a power source unit 40, a cooling fan 50, and a speaker 60. In addition, the lower cabinet 11 has also a control circuit unit not shown in FIG. 2.

The optical engine 20 includes a light source section 21 having a light source lamp and an optical system 22 modulating light from the light source section 21 and generating image light. The optical engine 20 is disposed in the lower cabinet 11 on a slightly rear side. The projection lens 30 is disposed in front of the optical system 22 of the optical engine 20 and slightly closer to a left side surface of the lower cabinet 11. The optical system 22 includes a prism unit 23.

Figure 3:
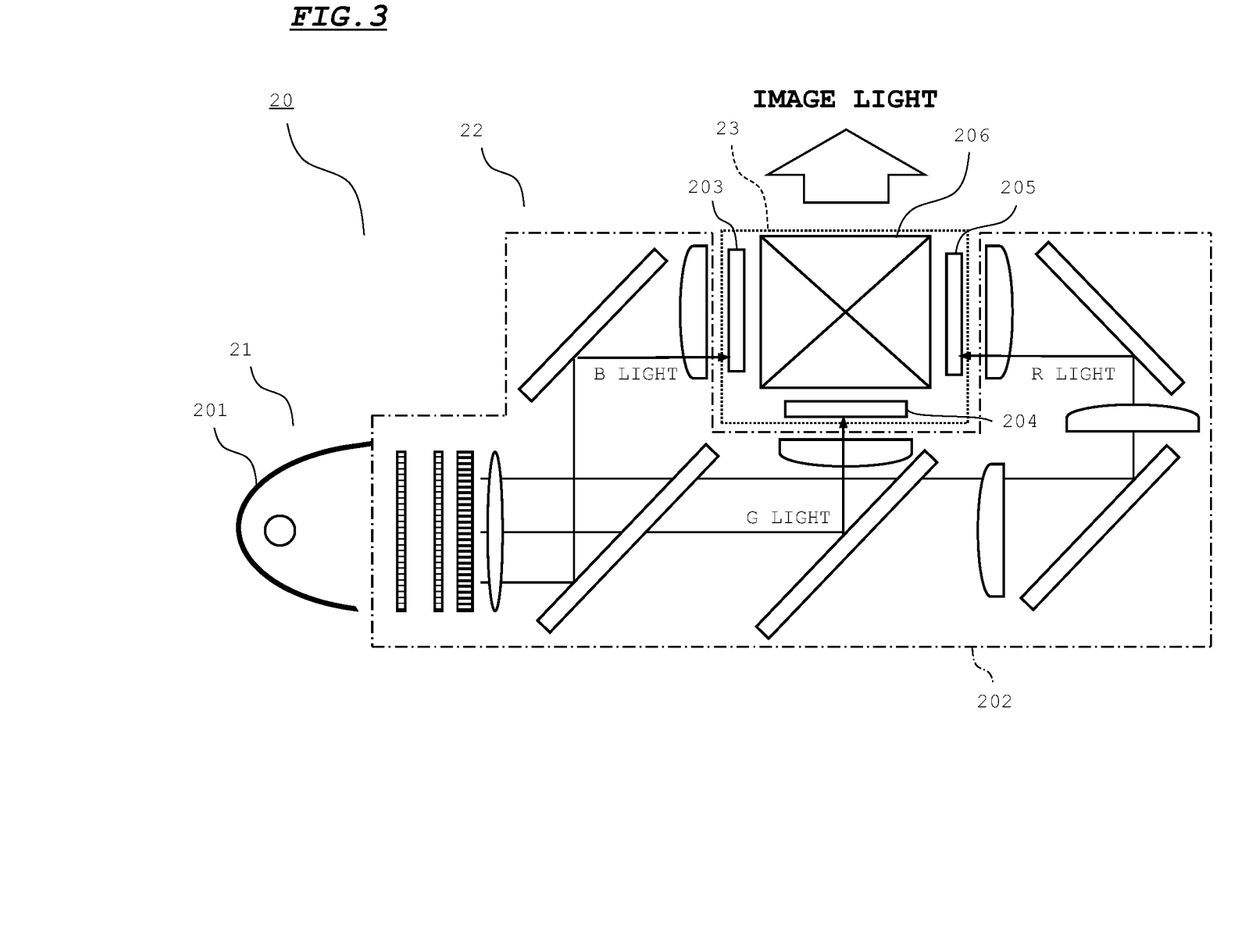
FIG. 3 is a diagram showing a configuration of an optical engine in the embodiment.

FIG. 3 is a diagram showing a configuration of the optical engine 20.

The light source section 21 includes a light source lamp 201. The optical system 22 includes a light-guiding optical system 202, three transmissive liquid crystal panels 203, 204, and 205, and a dichroic prism 206. The liquid crystal panels 203, 204, and 205 have polarizers at incident and output sides thereof. The liquid crystal panels 203, 204, and 205, the polarizers on the output sides, and the dichroic prism 206, are united as prism unit 23.

White light emitted from the light source lamp 201 is divided by the light-guiding optical system 202 into light of a blue wavelength band (hereinafter, referred to as "B light"), light of a green wavelength band (hereinafter, referred to as "G light"), and light of a red wavelength band (hereinafter, referred to as "R light"), and is radiated to the liquid crystal panels 203, 204, and 205. The B, G, and R lights modulated by the liquid crystal panels 203, 204, and 205, are combined in color and emitted as image light by the dichroic prism 206.

The imager constituting the optical engine 20 may be reflective liquid crystal panels or MEMS devices, in place of the transmissive light crystal panels 203, 204, and 205. In addition, the optical engine 20 may not be a three-panel optical system including three light imagers as described above but may be constituted by a single-panel optical system using a single light imager and a color wheel, for example.

Returning to FIG. 2, the power source unit 40 is disposed on a right side of the projection lens 30. The power source unit 40 supplies power to electrical components of the projector. The cooling fan 50 is interposed between the power source unit 40 and the light source section 21. The cooling fan 50 is an axial flow fan, for example. When the cooling fan 50 operates, external air is taken into the main body cabinet 10 through the upper air inlet 14 and the lower air inlet 15. The taken air cools down the power source unit 40 and then is sucked into the cooling fan 50. The air discharged from the cooling fan 50 cools down the light source section 21 and then is discharged to the outside through an air outlet (not shown) formed on a rear surface of the main body cabinet 10.

A speaker 60 is disposed on a left side of the projection lens 30. The speaker 60 outputs sounds corresponding to projected images. The output sounds are emitted to the outside from the sound output port 16.

Figure 4:
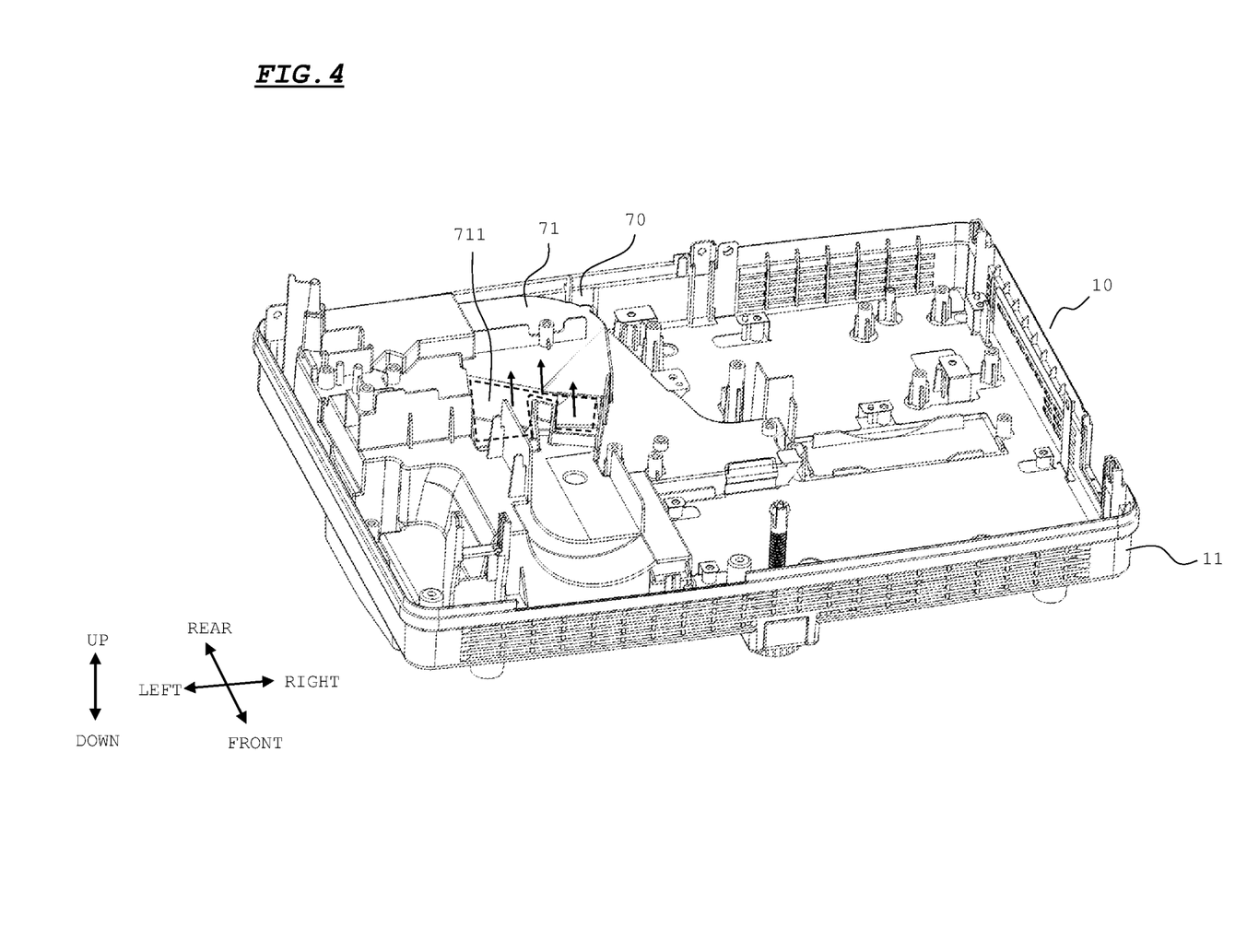
FIG. 4 is a diagram for describing a configuration of a cooling unit in the embodiment.
Figure 5:
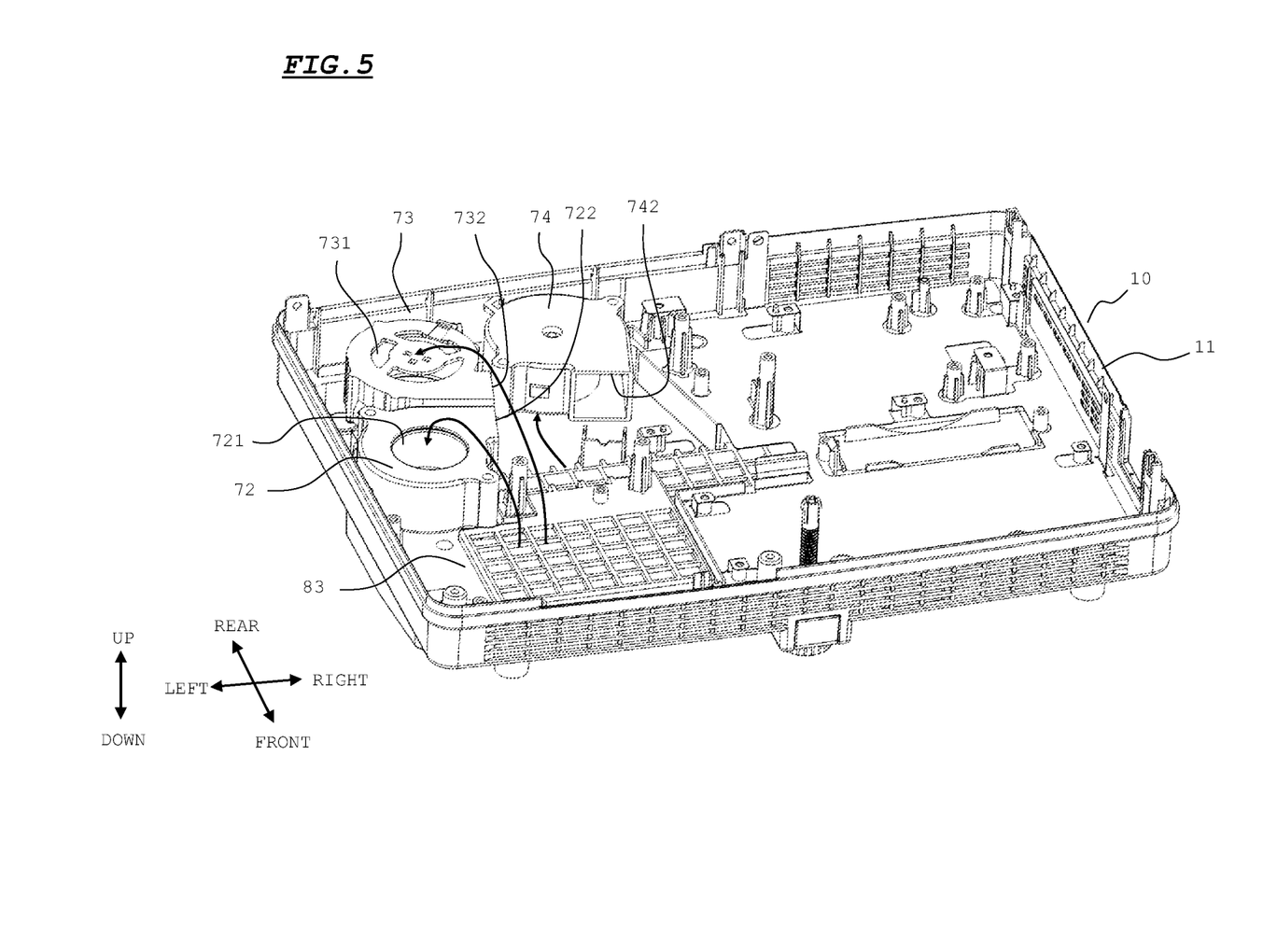
FIG. 5 is a diagram for describing a configuration of the cooling unit in the embodiment.

FIGS. 4 and 5 are diagrams for describing a configuration of the cooling unit 70. FIG. 4 is a perspective view of the lower cabinet 11 in the state of FIG. 2 from which the optical engine 20, the projection lens 30, the power source unit 40, the cooling fan 50, the speaker 60, and the like are detached. FIG. 5 is a perspective view of the lower cabinet 11 in the state of FIG. 4 from which a casing 71 is further detached.

The cooling unit 70 includes the casing 71 and three air intake fans 72, 73, and 74 disposed within the casing 71.

The air intake fans 72, 73, and 74 are centrifugal fans. The air intake fans 72 and 73 have suction openings 721 and 731 on both end surfaces thereof and discharge openings 722 and 732 on peripheral surfaces thereof. The air intake fan 74 has a suction opening (not shown) on a lower end surface thereof and a discharge opening 742 on a peripheral surface thereof.

The casing 71 covers the air intake fans 72, 73, and 74, and air inlets 83 formed on the bottom surface of the main body cabinet 10. The casing 71 has a blowing port 711 under the prism unit 23. When the casing 71 is attached to the lower cabinet 11, the discharge openings 722, 732, and 742 of the air intake fans 72, 73, and 74 communicate with the blowing port 711. In FIG. 4, an area of the blowing port 711 is shown by dashed lines to make the blowing port 711 more recognizable.

When the air intake fans 72, 73, and 74 operate, external air is taken through the air inlets 83 and sucked into the air intake fans 72, 73, and 74 as shown by arrows in FIG. 5. The air discharged from the air intake fans 72, 73, and 74 blows through the blowing port 711 toward the prism unit 23 as shown by arrows in FIG. 4. Accordingly, optical components of the prism unit 23 such as the liquid crystal panels 203, 204, and 205 are cooled down.

Figure 6:
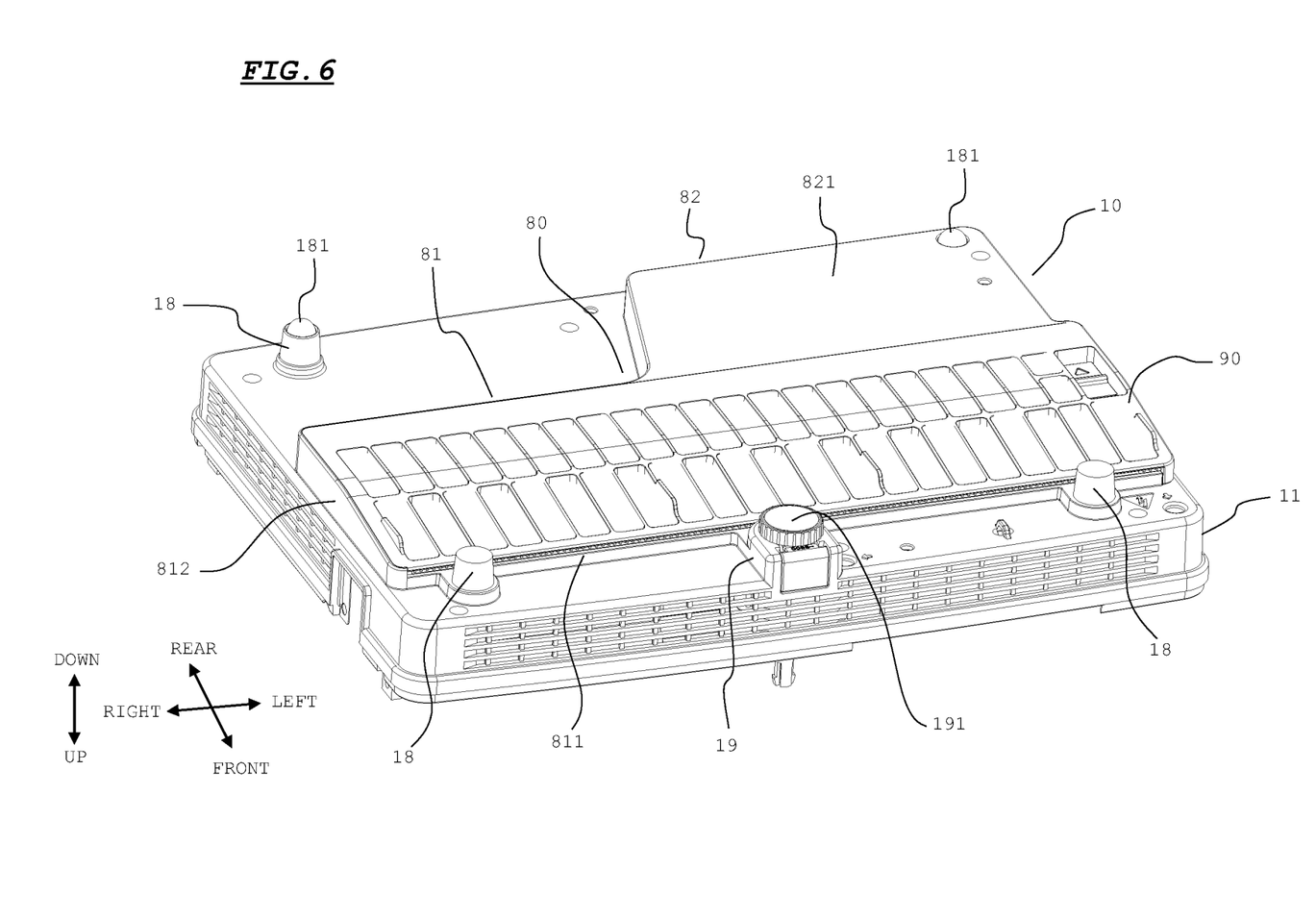
FIG. 6 is a diagram showing a configuration of a bottom surface of a main body cabinet in the embodiment.
Figure 7:
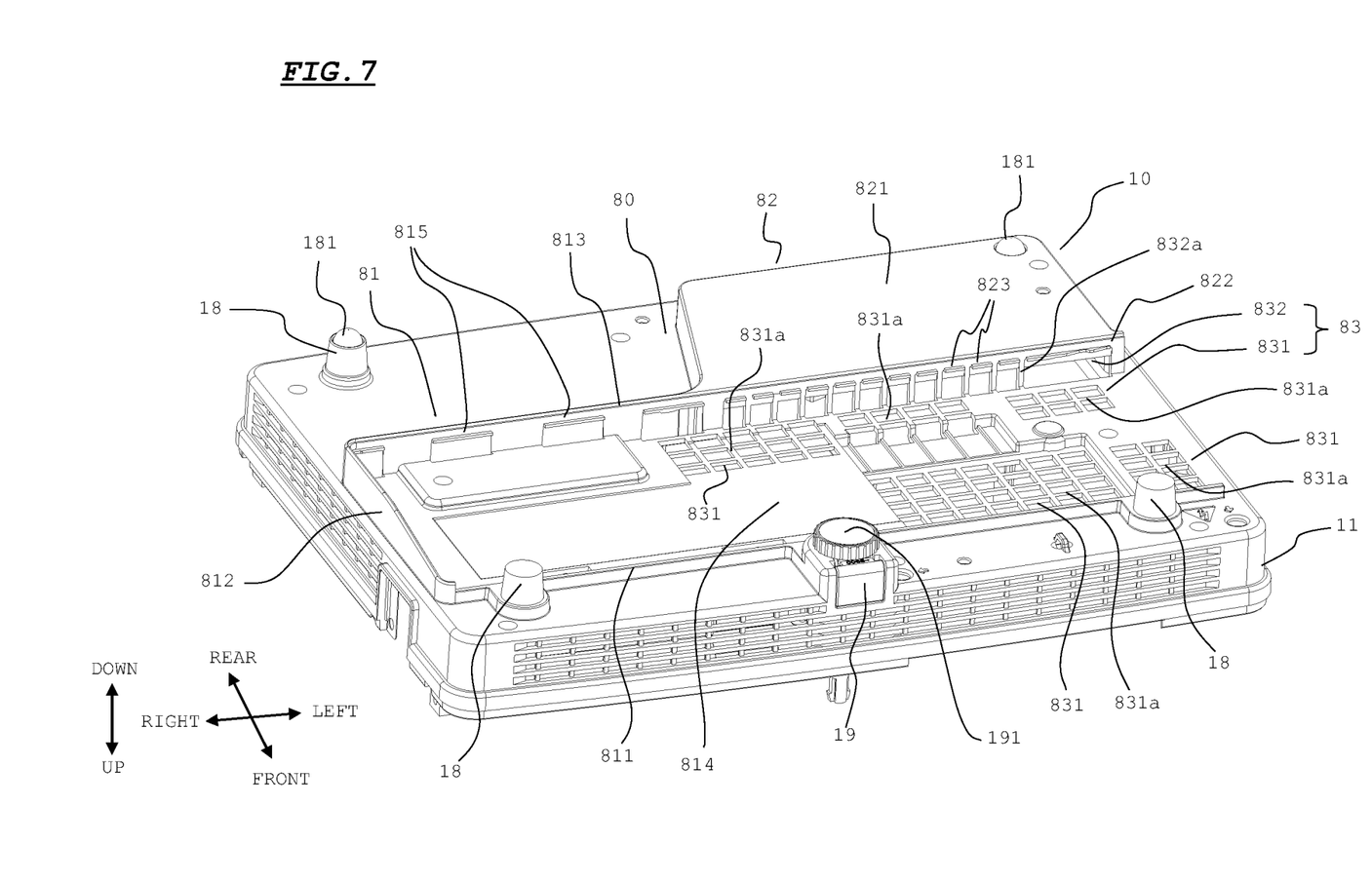
FIG. 7 is a diagram showing a configuration of the bottom surface of the main body cabinet.

FIGS. 6 and 7 are diagrams showing a configuration of the bottom surface of the main body cabinet 10. FIG. 6 is a perspective view of the main body cabinet 10 with the filter unit 90 attached. FIG. 7 is a perspective view of the main body cabinet 10 with the filter unit 90 detached.

The main body cabinet 10 (lower cabinet 11) has fixing legs 18 on the bottom surface thereof at right and left corners of a front portion and at a right corner of a rear portion. The fixing leg 18 at the rear portion has a leading end member 181 at a leading end thereof. The leading end member 181 is made of a rubber material and serves as a nonslip pad when the projector is installed on an installation surface. These fixing legs 18 support the main body cabinet 10 such that a clearance is produced between the installation surface and the bottom surface of the main body cabinet 10.

An adjustment leg 19 is disposed on the main body cabinet 10 at a center of the front portion. The adjustment leg 19 has a dial-type movable section 191. Moving the movable section 191 vertically can adjust inclination of the main body cabinet 10 in a front-back direction.

The main body cabinet 10 has an air inlet section 80 on the bottom surface thereof. The filter unit 90 is disposed on the air inlet section 80 in an attachable/detachable manner. The filter unit 90 has a rectangular shape and extends to both right and left ends of the bottom surface of the main body cabinet 10.

The air inlet section 80 includes a filter attachment portion 81 and an extended portion 82. The filter attachment portion 81 is constituted by a front wall 811, a side wall 812, a rear wall 813, a front surface wall 822 of the extended portion 82, and a bottom surface 814 (hereinafter, referred to as "first bottom surface") of the main body cabinet 10 surrounded by the foregoing walls. The front wall 811 is made lower than the rear wall 813 and the front surface wall 822 of the extended portion 82. The side wall 812 are made identical in height to the rear wall 813 in an area ranging from the rear wall 813 to a middle part, and are inclined at upper edges in an area ranging from the middle portion to the front wall 811 so as to become gradually smaller in height.

The extended portion 82 is formed such that a bottom surface 821 of an approximate left half behind the filter attachment portion 81 (hereinafter, referred to as "second bottom surface") overhangs than the first bottom surface 814. The three air intake fans 72, 73, and 74 are disposed above the second bottom surface 821. The second bottom surface 821 constitutes the bottom surface of the projector main body. The front surface wall 822 of the extended portion 82 connects the second bottom surface 821 with the first bottom surface 814 distant from the installation surface than the second bottom surface 821.

The extended portion 82 has a leading end member 181 identical to that at the fixing leg 18 at the right corner, at a rear left corner of the main body cabinet 10. The extended portion 82 functions as a fixing leg at a position with the leading end member 181.

The air inlet portion 80 has the air inlets 83. The air inlets 83 include bottom surface air inlets 831 and a side surface air inlet 832. The five bottom surface air inlets 831 are formed on the first bottom surface 814. The bottom surface air inlets 831 have a lattice portion 831*a* extending in longitudinal and transverse directions. The side surface air inlet 832 is formed on the front surface wall 822 of the extended portion 82. The side surface air inlet 832 has a lattice portion 832*a* extending in a longitudinal direction.

The rear wall 813 has a plurality of guide ribs 815 projecting forward at predetermined intervals in a right-left direction. In addition, the front surface wall 822 of the extended portion 82 has also a plurality of guide ribs 823. Although not shown in FIG. 7, the front wall 811 has a plurality of guide ribs 816 similar to those on the rear wall 813 (refer to FIG. 12) formed at predetermined intervals in the right-left direction.

Figure 8:
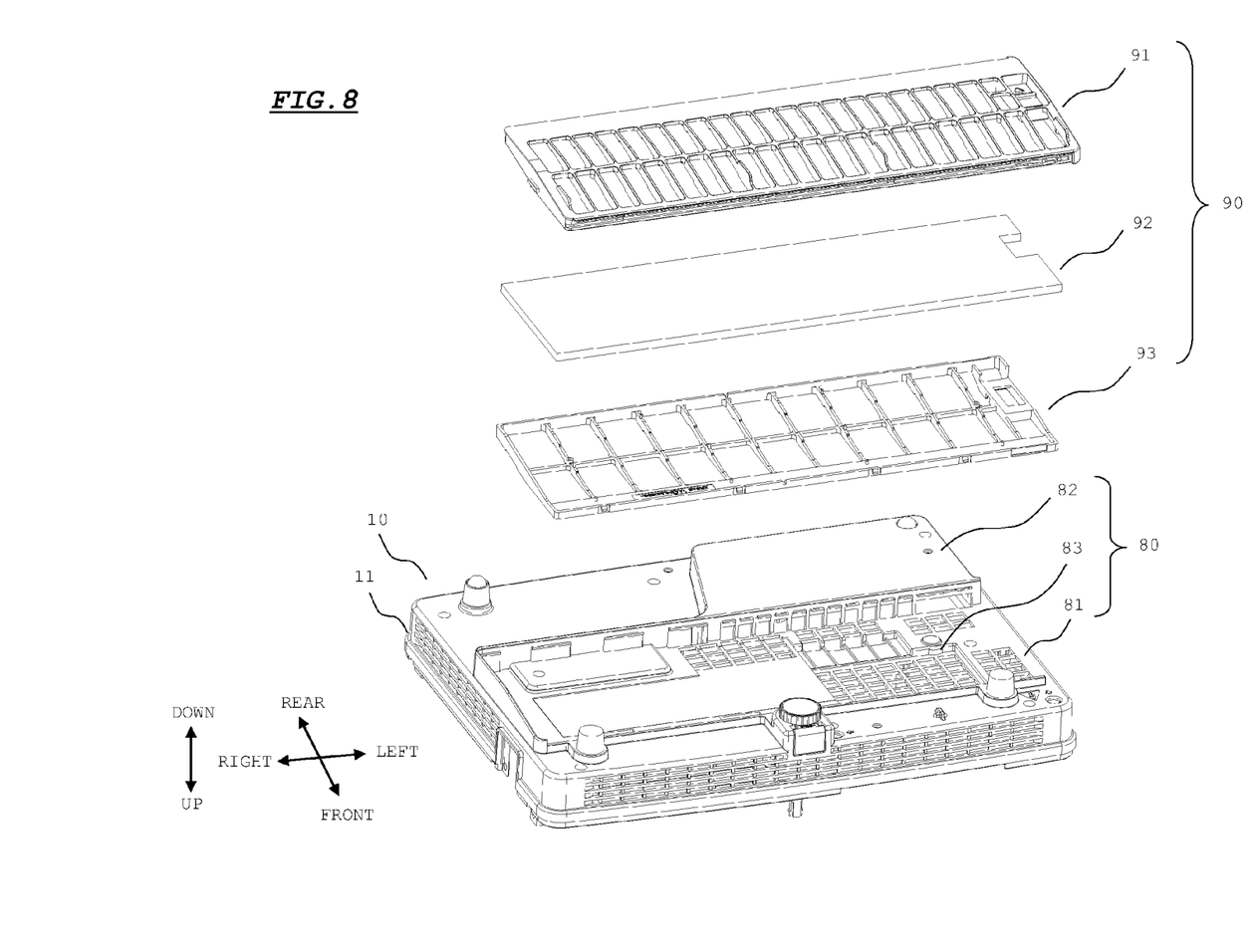
FIG. 8 is a diagram for describing a configuration of a filter unit in the embodiment.
Figure 9A:
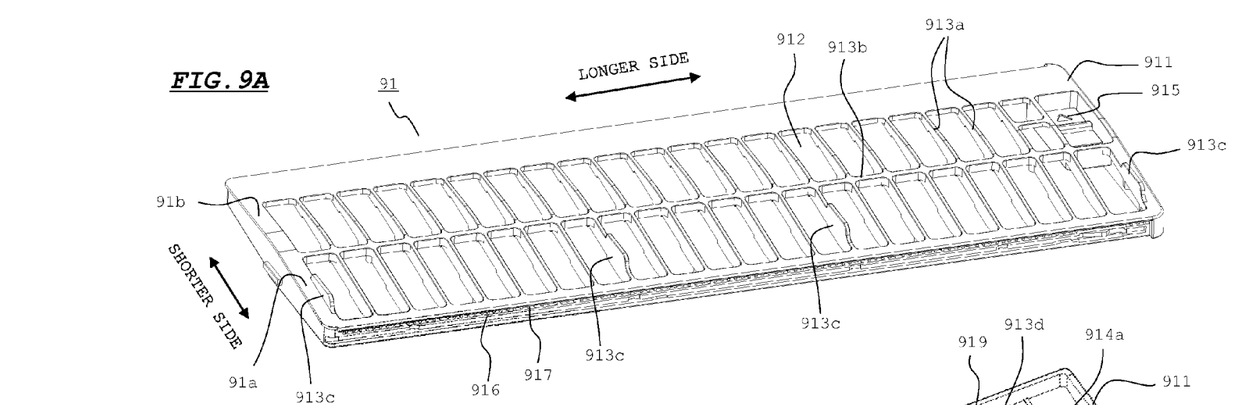
FIGS. 9A and 9B are diagrams for describing a configuration of the filter unit in the embodiment.
Figure 9B:
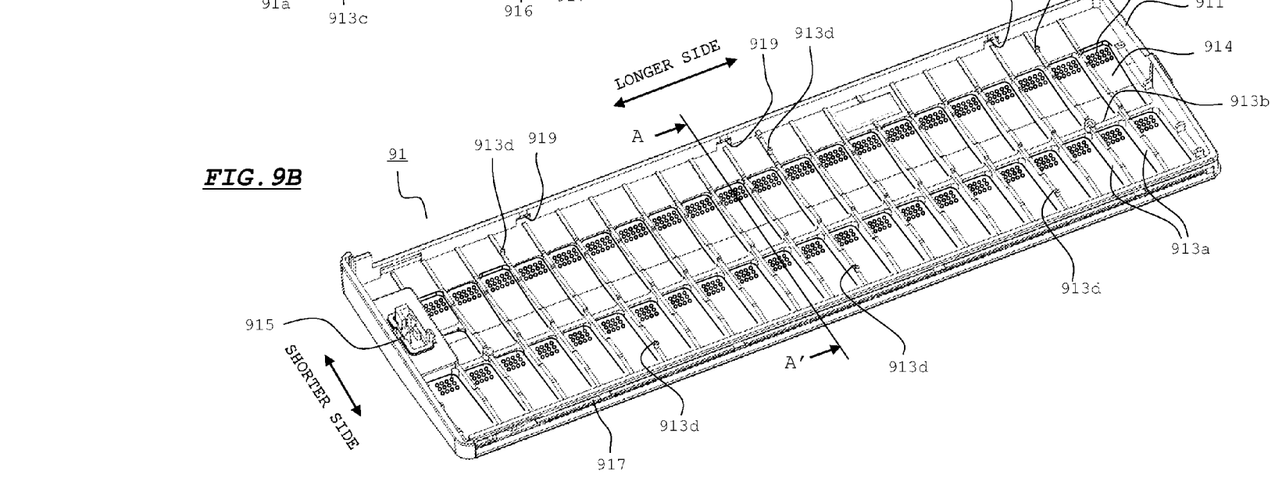
Figures 10A, 10B:
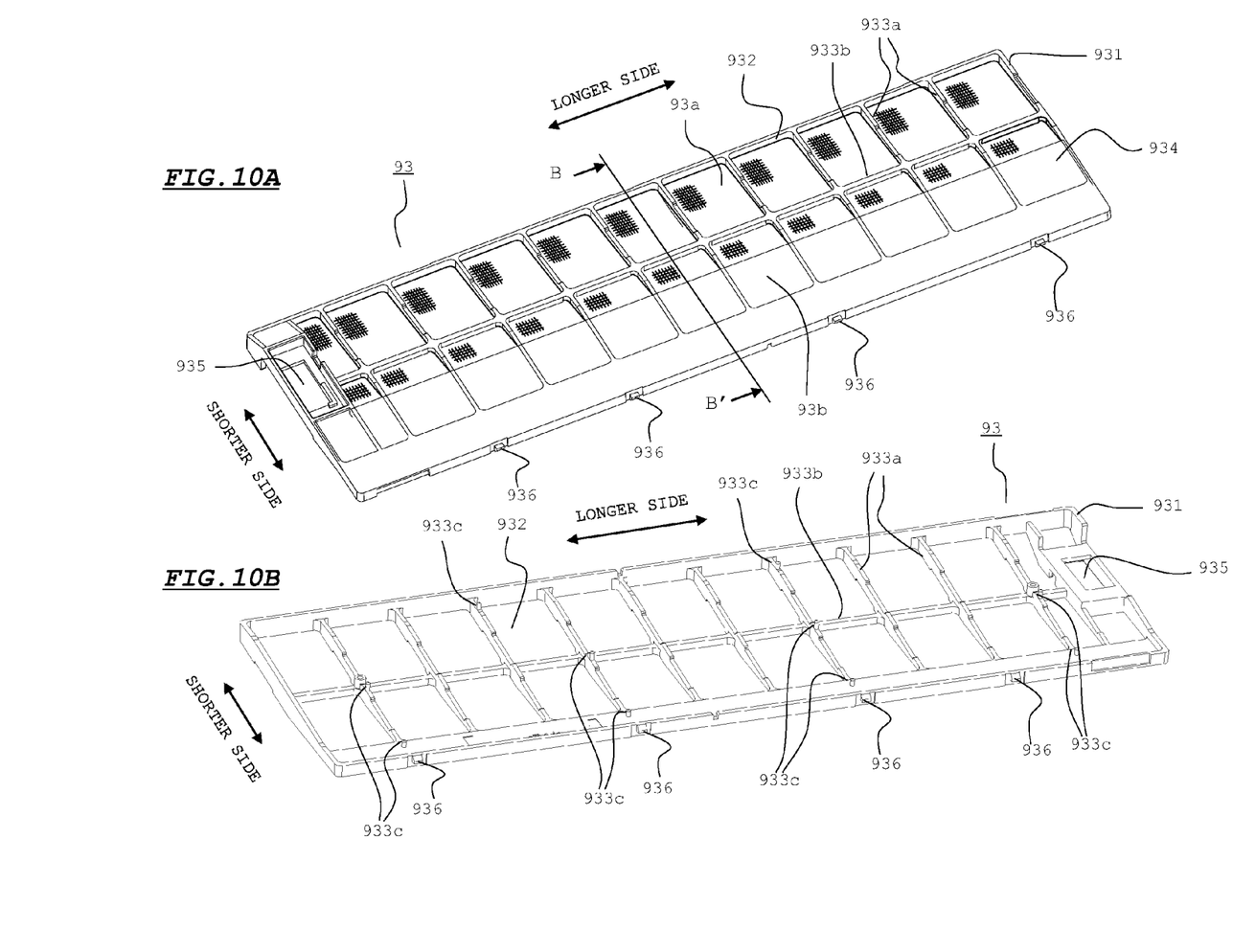
FIGS. 10A and 10B are diagrams for describing a configuration of the filter unit in the embodiment.
Figure 11A:
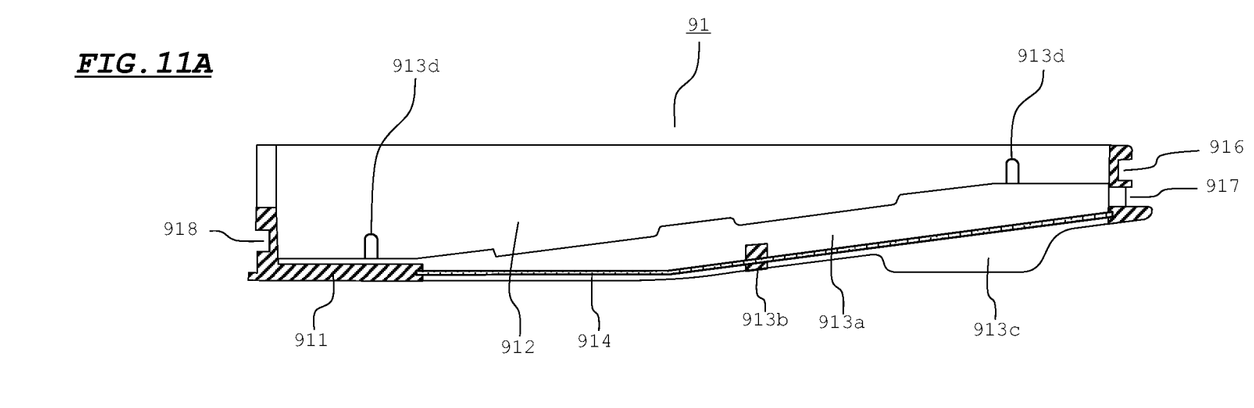
FIGS. 11A and 11B are diagrams for describing a configuration of the filter unit in the embodiment.
Figure 11B:
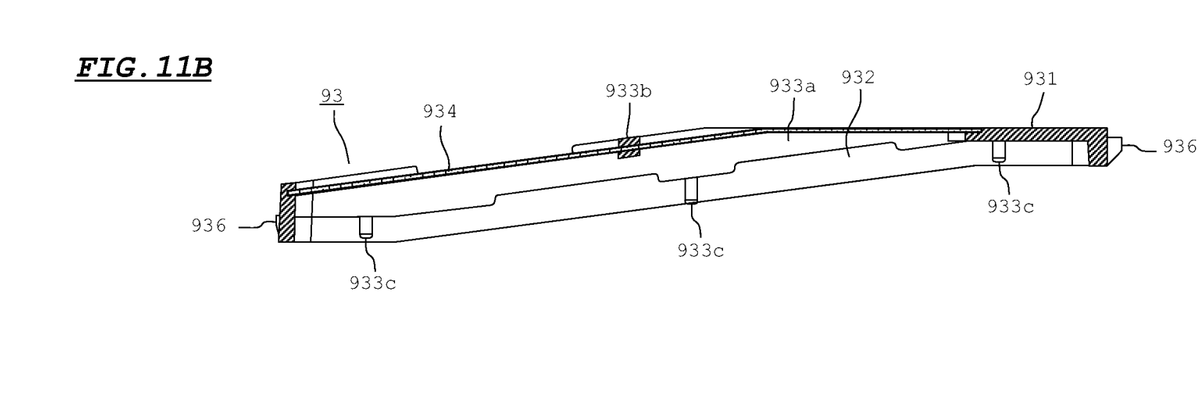

FIGS. 8 to 11B are diagrams for describing a configuration of the filter unit 90. FIG. 8 is an exploded perspective view of the lower cabinet 11 and the filter unit 90. FIGS. 9A and 9B are diagrams showing a configuration of a first filter section 91: FIG. 9A is a perspective front view of the first filter section 91; and FIG. 9B is a perspective back view of the first filter section 91. FIGS. 10A and 10B are diagrams showing a configuration of a third filter section 93: FIG. 10A is a perspective front view of the third filter section 93; and FIG. 10B is a perspective back view of the third filter section 93. FIG. 11A is a cross sectional view of FIG. 9B taken along a line A-A'. FIG. 11B is a cross sectional view of FIG. 10A taken along a line B-B'.

Referring to FIG. 8, the filter unit 90 is a multilayered filter constituted by the first filter section 91, a second filter section 92, and the third filter section 93.

The first filter section 91 is positioned closest to the installation surface when the filter unit 90 is attached to the filter attachment portion 81. The first filter section 91 is the coarsest among the three filter sections 91, 92, and 93.

Referring to FIGS. 9A, 9B, and 11A, the first filter section 91 includes a rectangular frame 911. The frame 911 has a rectangular opening 912 on a front surface thereof. The opening 912 has a plurality of ribs 913*a* extending along a shorter side of the frame 911 at predetermined intervals. The opening 912 has in a middle portion thereof a single rib 913*b* extending along a longer side of the frame 911.

A filter 914 is disposed within the opening 912. The filter 914 is a rectangular metal sheet formed in a slightly larger size than that of the opening 912. The filter 914 has a large number of fine punch holes 914*a* formed on an approximately entire surface thereof. The frame 911 is made of a resin material. The filter 914 is integrated with the frame 911 by insert molding, for example.

When the filter unit 90 is attached to the filter attachment portion 81, the front surface of the first filter section 91 is opposed to the installation surface and constitutes an intake surface of external air. The front surface of the first filter section 91 is divided into a first air intake surface 91*a* and a second air intake surface 91*b* along the shorter side thereof. The first air intake surface 91*a* is inclined with respect to the second air intake surface 91*b*.

The frame 911 has a plurality of adhesion-preventive ribs 913*c* formed on the first air intake surface 91*a*. Even if a sheet-like material such as paper sticks to the first air intake surface 91*a* during suction of external air, the material contacts these adhesion-preventive ribs 913*c* and becomes less prone to adhere closely to the first air intake surface 91*a*.

In addition, the frame 911 has a lock lever 915 on the second air intake surface 91*b* at one end along the longer side thereof. The lock lever 915 locks the filter unit 90 such that the filter unit 90 does not come off the filter attachment portion 81.

The frame 911 has a guide groove 916 extending along the longer side on an end surface along the shorter side thereof at the first air intake surface 91*a* side. In addition, the frame 911 has on this end surface thereof a large number of vent holes 917 along the longer side between the guide groove 916 and the first air intake surface 91*a*. The frame 911 has also a guide groove 918 similar to the guide groove 916 (refer to FIG. 11A), on an end surface along the shorter side thereof at the second air intake surface 91*b* side. Further, the frame 911 has a plurality of engaging concave portions 919 on these end surfaces at a back side thereof. FIG. 9B shows only engaging concave portions 919 on one end surface thereof.

The frame 911 has a plurality of projections 913*d* on a back surface thereof. These projections 913*d* hold the second filter section 92 so that the second filter section 92 does not move when the second filter section 92 is stored between the first filter section 91 and the third filter section 93.

In FIG. 9A, the filter 914 is not shown. In addition, in FIG. 9B, only some of the punch holes 914*a* are shown in the filter 914. Further, in FIG. 9B, the punch holes 914*a* are drawn in a larger size than in reality for the sake of convenience.

Returning to FIG. 8, the second filter section 92 is a rectangular filter made of urethane. The second filter section 92 is finer than the first filter section 91.

The third filter section 93 is positioned closest to the air inlets 83 when the filter unit 90 is attached to the filter attachment portion 81. The third filter section 93 is the finest among the three filter sections 91, 92, and 93.

Referring to FIGS. 10A, 10B, and 11B, the third filter section 93 includes a rectangular frame 931. The frame 931 has a rectangular opening 932 on a front surface thereof. The opening 932 has a plurality of ribs 933*a* extending along a shorter side of the frame 931 at predetermined intervals. The opening 932 has a single rib 933*b* formed in a middle portion of the frame 931 so as to extend along a longer side of the frame 931.

A filter 934 is disposed within the opening 932. The filter 934 is a metal mesh filter formed in a slightly larger size than that of the opening 932. The frame 931 is formed of a resin material, and the filter 934 is integrated with the frame 931 by insert molding, for example.

When the filter unit 90 is attached to the filter attachment portion 81, the front surface of the third filter section 93 is opposed to the air inlets 83 and constitutes a discharge surface of air from the filter unit 90. The front surface of the third filter section 93 is divided into a first air discharge surface 93*a* and a second air discharge surface 93*b* along a shorter side thereof. The first air discharge surface 93*a* is inclined with respect to the second discharge surface 93*b*.

The frame 931 has at one end portion along a longer side thereof an opening 935 corresponding to the lock lever 915.

The frame 931 has on both end surfaces along the shorter side thereof pawl portions 936 corresponding to the engaging concave portions 919 of the first filter section 91. FIGS. 10A and 10B each show only the pawl portions 936 on one end surface.

The frame 931 has on the back surface thereof a plurality of projections 933c. These projections 933c hold the section filter section 92 so that the second filter section 92 does not move, as with the projections 913d of the first filter section 91.

FIG. 10B does not show the filter 934. FIG. 10A shows only some of the meshes in the filter 934. In addition, in FIG. 10A, the meshes are drawn coarser than in reality for the sake of convenience.

The filter unit 90 is assembled by connecting the first filter section 91 and the third filter section 93 at back surface sides thereof with the second filter section 92 therebetween. In this case, the third filter section 93 is fitted into the first filter section 91, and the pawl portions 936 of the third filter section 93 engage with the engaging concave portions 919 of the first filter section 91. Accordingly, the first filter section 91 and the third filter section 93 become less prone to be separated.

As shown in FIG. 7, the filter attachment portion 81 is opened at the left side of the main body cabinet 10. The filter unit 90 is slid from the open end side of the filter attachment portion 81 toward the side wall 812 such that the guide grooves 916 and 918 of the first filter section 91 move along the guide ribs 815 and 816 of the filter attachment portion 81. Accordingly, the filter unit 90 is attached to the filter attachment portion 81 as shown in FIG. 6.

Figure 12:
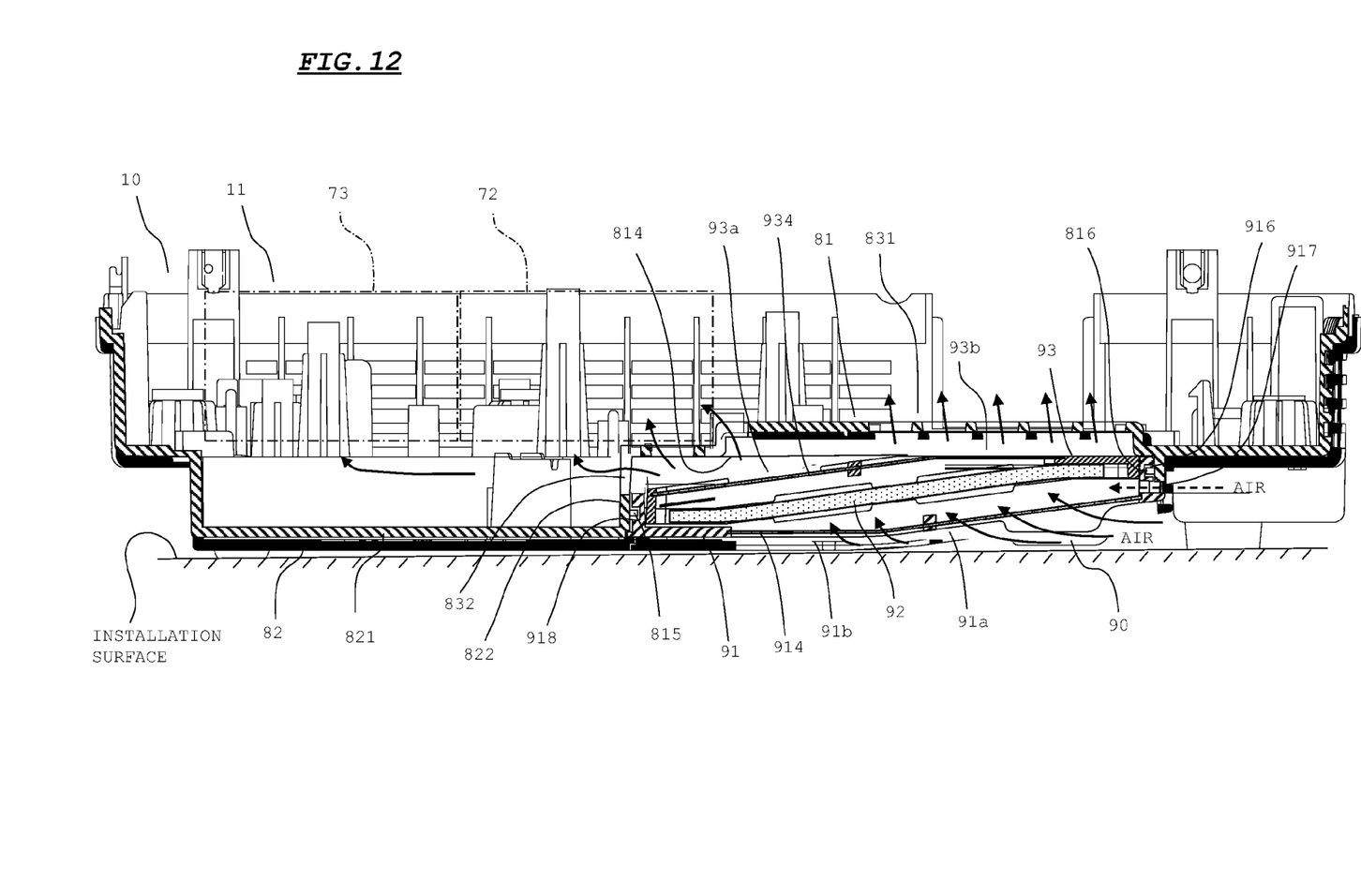
FIG. 12 is a vertical cross sectional view of the main body cabinet with the filter unit attached in the embodiment, the main body cabinet being cut in a front-rear direction.

FIG. 12 is a vertical cross sectional view of the main body cabinet 10 with the filter unit 90 attached, which is cut in the front-rear direction. FIG. 12 shows the projector installed on an installation surface. FIG. 12 shows the air intake fans 72 and 73 by one-dotted chain lines, but does not show the other constituent components in the lower cabinet 11 and the upper cabinet 12.

When the filter unit 90 is attached to the filter attachment portion 81, the guide grooves 916 and 918 of the first filter section 91 engage with the guide ribs 815 and 816 of the filter attachment portion 81. Accordingly, the filter unit 90 does not come off downward.

The first filter section 91 is in a state in the front-rear direction where the first air intake surface 91a on the front side is inclined with respect to the second bottom surface 821 in a direction that departs from the installation surface. In addition, the first filter section 91 is in a state where the second air intake surface 91b on the rear side is approximately parallel to the second bottom surface 821. Since the first air intake surface 91a is inclined, a large clearance is produced between the first air intake surface 91a and the installation surface, as compared with the clearance between the second air intake surface 91b and the installation surface.

Meanwhile, the third filter section 93 is in a state in the front-rear direction where the first air discharge surface 93a on the rear side is inclined in a direction that departs from the first bottom surface 814. In addition, the third filter section 93 is in a state where the second air discharge surface 93b on the front side is approximately parallel to the first bottom surface 814. Since the first air discharge surface 93a is inclined, a clearance is produced between the first air discharge surface 93a and the front surface wall 822 of the extended portion 82, thereby to let air emitted from the filter unit 90 flow into the side surface air inlet 832.

When the three air intake fans 72, 73, and 74 operate, external air is taken into the main body cabinet 10 through the filter unit 90. At that time, most of the external air is taken from the first air intake surface 91a through the clearance between the first air intake surface 91a and the installation surface, as shown by solid arrows in FIG. 12. The external air passes through the filter 914 where relatively large dust and the like are removed from the air.

In addition, the external air is also taken from the vent holes 917 as shown by a dashed arrow. The air taken from the vent holes 917 does not pass through the filter 914, but relatively large dust and the like do not enter into the vent holes 917 because the vent holes 917 are appropriately small in size.

The air having passed through the filter 914 and having been taken from the vent holes 917, passes through the second filter section 92 where dust and the like are further removed from the air. The air having passed through the second filter section 92, passes through the filter 934 where finer dust and the like are removed from the air, and then is discharged from the first air discharge surface 93a and the second air discharge surface 93b.

Accordingly, the air removed of dust and the like by the filter unit 90 is taken into the main body cabinet 10 through the bottom surface air inlets 831 and the side surface air inlet 832 as shown by solid arrows.

In this arrangement, the air intake fans 72, 73, and 74 are positioned in height almost identical to the first bottom surface 814. Accordingly, a large clearance is produced between the lower end surfaces of the air intake fans 72, 73, and 74 and the second bottom surface 821. That is, a wide space is produced within the extended portion 82. Accordingly, the air taken from the side surface air inlet 832 flows smoothly within the extended portion 82, and is favorably sucked into the air intake fans 72, 73, and 74.

According to this embodiment as described above, since the air intake surfaces of the first filter section 91 include the first air intake surface 91a inclined in a direction that departs from the installation surface, it is possible to favorably take in air into the filter unit 90 through the clearance between the first air intake surface 91a and the installation surface. Therefore, even if the filter unit 90 has a multilayered structure, it is possible to suppress increase of a clearance between the bottom surface of the main body cabinet 10 and the installation surface which is required to provide sufficient intake air. This prevents the projector to be increased in height.

In addition, according to this embodiment, the extended portion 82 is formed behind the filter attachment portion 81, and the side surface air inlet 832 is provided on the front surface wall 822 of the extended portion 82. Accordingly, it is possible to favorably take in air emitted from the filter unit 90 through not only the bottom surface air inlets 831 but also the side surface air inlet 832. This makes it possible to efficiently take the air into the main body cabinet 10. In addition, the air discharge surfaces of the third filter section 93 include the first air discharge surface 93a inclined in a direction that departs from the first bottom surface 814. Accordingly, it is possible to guide smoothly the air emitted from the filter unit 90 toward the side surface air inlet 832.

Further, according to this embodiment, the first filter section 91 is provided with the second air intake surface 91b less inclined than the first air intake surface 91a, behind the first air intake surface 91a. In this embodiment, the second air intake surface 91b is approximately parallel to the installation surface. The third filter section 93 is provided with the second air discharge surface 93b less inclined than the first air discharge surface 93a, in front of the first air discharge surface 93a. In this embodiment, the second air discharge surface 93b is approximately parallel to the first bottom surface 814. This allows the filter unit 90 to be increased in thickness, whereby it is possible to arrange smoothly the filter sections 91, 92, and 93 in the filter unit 90.

Moreover, in this embodiment, it is possible to take external air into the filter unit 90 through the vent holes 917 as well, which allows the air to be more efficiently taken into the main body cabinet 10.

Although an embodiment of the present invention is as described above, the present invention is not limited to this embodiment. In addition, the embodiment of the present invention can further be modified in various manners besides the foregoing ones.

For example, in the foregoing embodiment, the filter unit 90 is composed of the three filter sections 91, 92, and 93. However, the filter unit 90 is not limited to this embodiment but may be composed of two, or four or more filter sections.

In addition, in the foregoing embodiment, the second air intake surface 91b and the second air discharge surface 93b are made approximately parallel to the first bottom surface 814. However, the second air intake surface 91b and the second air discharge surface 93b are not limited to this embodiment but may be less inclined with respect to the first bottom surface 814 than the first air intake surface 91a and the first air discharge surface 93a.

Figure 13:
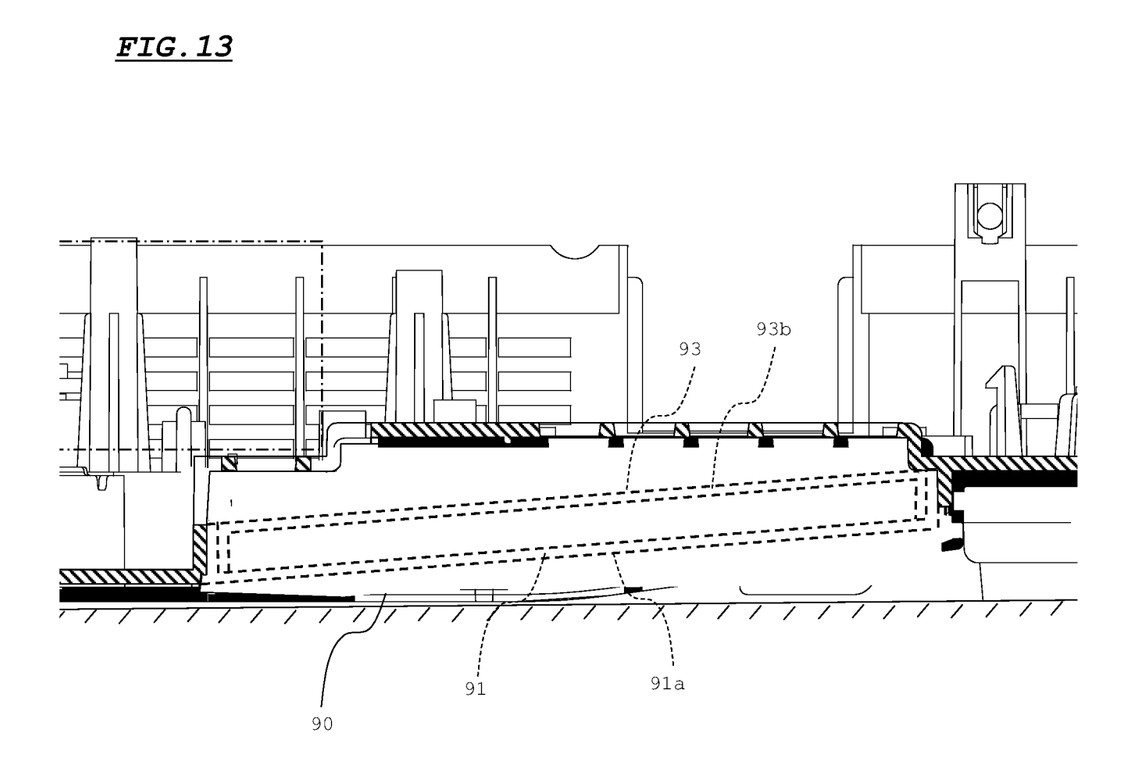
FIG. 13 is a diagram for describing a configuration of the filter unit in which all of an air intake surface of a first filter section and all of an air discharge surface of a second filter section are inclined.

Further, the second air intake surface 91b and the second air discharge surface 93b may not be necessarily provided. Specifically, as shown by dashed lines in FIG. 13, the entire air intake surface of the first filter section 91 may be formed by the first air intake surface 91a, and the entire air discharge surface of the third filter section 93 may be formed by the first air discharge surface 93a. In this case, however, the filter unit 90 is decreased in thickness as compared with the foregoing embodiment. Accordingly, it is likely that the second filter section 92 becomes thinner or the clearances between the filter 914, the second filter section 92, and the filter 934 become narrower.

Moreover, in the foregoing embodiment, the filter 914 of the first filter section 91 has a large number of punch holes 914a. Alternatively, the filter 914 may be a metal mesh filter as with the filter 934. In this case, the filter 914 has a mesh made coarser than that of the filter 934. In addition, the second filter section 92 is not limited to a urethane filter but may be a filter made of nonwoven cloth, for example. Further, the second filter section 92 may be a metal mesh filter.

In addition, in the foregoing embodiment, the filter unit 90 and the air intake section 80 are configured such that the vent holes 917 of the first filter section 91 face forward. However, the filter unit 90 and the air intake section 80 are not limited to this embodiment but may be configured such that the vent holes 917 face rearward, leftward, or rightward.

The embodiment of the invention may be changed or modified in various ways as necessary, as far as such changes and modifications do not depart from the scope of the claims of the invention.

What is claimed is:

1. A projection display device, comprising:

a leg section which supports a main body of the projection display device with respect to an installation surface on which the main body is installed; and a filter section which is disposed on a bottom of the main body and takes in external air from a first air intake surface exposed to the outside of the main body to remove dust from the external air, wherein the first air intake surface is inclined with respect to the bottom surface of the main body in a direction that departs from the installation surface, and air flows into the filter section through a clearance between the first air intake surface and the installation surface, wherein the filter section includes a second air intake surface formed at an end portion of the first air intake surface closer to the installation surface and less inclined than the first air intake surface, wherein a filter housing section which houses the filter section is provided on a bottom of the main body, the filter housing section includes a first surface more distant from the installation surface than a bottom surface of the main body and a second surface connecting the bottom surface of the main body with the first surface, and the first surface and the second surface each have an air inlet for taking air having passed through the filter section into the main body, and wherein the filter section includes a first air discharge surface inclined in a direction that departs from the first surface, and a clearance is produced between the first discharge surface and the second surface.

2. The projection display device according to claim 1, wherein the filter section includes a second air discharge surface formed at an end portion of the first discharge surface closer to the first surface and less inclined than the first air discharge surface.

3. The projection display device according to claim 1, wherein the filter section has a vent hole for flowing air into the filter section, on an end surface opposite to the second surface with the first surface therebetween.

4. The projection display device according to claim 1, wherein the first air intake surface has a rib formed for preventing adhesion of a foreign matter to the first air intake surface.

* * * * *